United States Patent [19]
Huterer et al.

[11] Patent Number: 6,111,856
[45] Date of Patent: Aug. 29, 2000

[54] SWITCHING ELEMENT PARTICULARLY FOR ATM CELLS IMPLEMENTING PROBABILISTIC PRIORITIES ASSOCIATED WITH THE CELLS

[75] Inventors: Mario Huterer, Monza, Italy; Frédéric Berrouet, Biarritz, France

[73] Assignee: Alcatel, Paris, France

[21] Appl. No.: 09/005,002

[22] Filed: Jan. 9, 1998

[30] Foreign Application Priority Data

Jan. 13, 1997 [FR] France ................................ 97 00254

[51] Int. Cl.[7] ................................ G06F 9/46; H04J 3/26
[52] U.S. Cl. ........................ 370/252; 370/352; 370/380; 709/103
[58] Field of Search .................................... 370/252, 352, 370/357, 380; 709/102, 103

[56] References Cited

U.S. PATENT DOCUMENTS

| | | | |
|---|---|---|---|
| 4,872,159 | 10/1989 | Hemmady et al. | 370/380 |
| 5,247,677 | 9/1993 | Welland et al. | 709/103 |
| 5,381,546 | 1/1995 | Servi et al. | 709/102 |
| 5,467,347 | 11/1995 | Petersen | 370/230 |
| 5,995,997 | 11/1999 | Horvitz | 709/102 |

FOREIGN PATENT DOCUMENTS

0473330 A1  3/1992  European Pat. Off. .

*Primary Examiner*—Alpus H. Hsu
*Assistant Examiner*—Afsar M. Qureshi
*Attorney, Agent, or Firm*—Sughrue, Mion, Zinn, Macpeak & Seas, PLLC

[57] ABSTRACT

A switching element includes a plurality of input ports and at least one output port, a spacial switching mechanism, and a cell memory in which cells are stored, the cells being classifiable according to at least one given characteristic. It is characterized in that the transmission element includes means to access the cells contained in the cell memory selectively according to the characteristic, a probability memory associating a probability $p_i$ with each possible value i of the characteristic, and a server which chooses the cell to be transmitted from among those contained in the cell memory according to the probabilities ($p_i$) contained in the probability memory and the presence or absence of a cell in the cell memory for each value (i) of the characteristic.

6 Claims, 1 Drawing Sheet

SWITCHING ELEMENT PARTICULARLY FOR ATM CELLS IMPLEMENTING PROBABILISTIC PRIORITIES ASSOCIATED WITH THE CELLS

BACKGROUND OF THE DISCLOSURE

The field of the invention is that of telecommunications networks. These networks make it possible to convey all types of information (sound, video, digital data . . . ) from a transmitter to a receiver, each type of information having specific characteristics and giving rise to specific constraints.

More specifically, the present invention concerns a switching element in a telecommunications network of asynchronous time-division type, particularly of ATM type (Asynchronous Transfer Mode), taking into account the characteristics of the communications conveyed so as to privilege certain communications at the expense of others according to these characteristics.

Generally speaking, telecommunications networks can be divided into two large families depending on whether they implement spacial techniques or time-division techniques.

Spacial techniques consist of assigning a permanent physical path to each communication channel and therefore of distributing the communications in space.

Time-division techniques can themselves be subdivided into two subfamilies: synchronous time-division techniques and asynchronous time-division techniques.

In the case of synchronous time-division techniques, the information carriers are time intervals allocated in frames, identified by their position in this frame.

In the case of asynchronous time-division techniques, the carriers of the data transmitted through the network are packets which, in the case of ATM, are referred to as cells and possess a standardized length of 53 octets divided into a 5-octet header and a 48-octet information field, or ATM conduit.

Although the basic format of the cell is the same regardless of the nature of the data conveyed, each of the connections has, depending on its nature, specific characteristics as regards traffic and quality of service (QoS). The characteristics (including the price, the average rate, the peak rate . . . ) of each connection must be specified in a detailed manner in the contract binding the user of the ATM connection and the network operator who provides it to him and are therefore known to the ATM network.

The orientation of a cell within an equipment, a cell in a switch, for example, implies that at least the header of this cell be taken into account by the equipment so as to determine the destination towards which it must be routed by the equipment itself. The various routing mechanisms (spacial switching of cells) are described in the book by Martin de Prycker "ATM— Asynchronous Transfer Mode", published in French by Masson.

Conventionally, a switching equipment comprises a FIFO (First In, First Out) type memory intended to receive the cells, as well as a spacial switching mechanism.

In the course of their transfer through the network, the cells are stored in queues whose filling ratio varies according to the instantaneous load. As a result, the cell transit time may vary from one cell to another for a given communication. This therefore induces a variable delay between two successive cells of the same communication; this delay is called cell jitter.

Now, for so-called synchronous traffic, it is essential to minimize the cell jitter. Non observance of this constraint may result in receiver "famine". This is the case, for example, with telephone communications, video telephony, etc.

A known solution to the cell jitter problem is described in the article "Services audiovisuels et protocoles associés" (Audiovisual services and associated protocols) by Jean-Yves Cochennec and Thierry Houdoin of the CNET, published in L'écho des Recherches, no. 44, 1991.

Indeed, once the maximum deviation of the variation in cell propagation time through the network is known, it is merely necessary to initially defer the forwarding of the information to the receiving terminal using a value equal to this maximum deviation. This maximum deviation is the difference between the longest end-to-end transmission time and the shortest end-to-end transmission time. Existing modeling techniques make it possible to bound these fluctuations in transmission time and therefore the maximum deviation of the cell jitter. Such a mechanism therefore guarantees the absence of receiver famine, even in the most unfavorable cases.

However, even though it solves the cell jitter problem, this mechanism induces a delay which can be detrimental to certain types of traffic, particularly interactive or real-time traffic.

Indeed, certain types of services such as videoconferencing or conventional voice telephony require a minimization of the cell jitter and of the end-to-end transmission time.

SUMMARY OF THE INVENTION

The general goal consists of proposing an ATM type switch which takes into account the characteristics of the connections and the constraints to which they are subjected so as to privilege certain connections as opposed to others by means of a probabilistic priority scheme and according to these characteristics.

One particular implementation of the present invention therefore makes it possible to supply an ATM type switch which simultaneously minimizes the cell jitter and the end-to-end transmission time for all traffic types for which these constraints are critical at the expense of lower priority traffic types.

Another implementation of the invention makes it possible to supply an ATM switch which takes into account the price paid by the user to access the network.

Despite the fact that only switches which take into account the price characteristics of the connections and the type of traffic conveyed by the connections are described, a switch implementing other connection characteristics falls within the scope of the present invention.

The general principle of the invention consists of assigning a transmission probability value to each value of the characteristic considered. This value represents the probability that the switch will send a cell having the characteristic considered to the output port. Thus, in the case where the characteristic considered is the type of traffic conveyed, a higher probability will be chosen for synchronous traffic than for asynchronous traffic so that synchronous traffic will be statistically privileged without necessarily interrupting the other communications.

A switching element according to the invention includes a plurality of input ports and at least one output port, a spacial switching mechanism and a cell memory in which the cells are stored, said cells being classifiable according to at least one given characteristic which can only take on a finite number of values, and it is characterized in that it includes:

a means to access the cells contained in said cell memory selectively according to said characteristic, a probability memory associating a probability $p_i$ with each possible value i of said characteristic, a server which chooses the cell to be transmitted from among those contained in said cell memory according to the probabilities ($p_i$) contained in the probability memory and the presence or absence of a cell in the cell memory for each value (i) of said characteristic.

As previously mentioned, the characteristic according to which the classification is made can be the traffic type (voice, video . . . ) or the connection price, but other characteristics can be used without departing from the scope of the invention.

By choosing the traffic type as the criteria, the invention will make it possible to minimize the cell jitter and the end-to-end transmission time for connections for which these constraints are significant to the detriment of the other connections.

BRIEF DESCRIPTION OF THE DRAWINGS

The invention, its characteristics and its advantages will be more clearly understood upon reading the description which follows, made with reference to the figures mentioned below.

DETAILED DESCRIPTION

Figure 1:
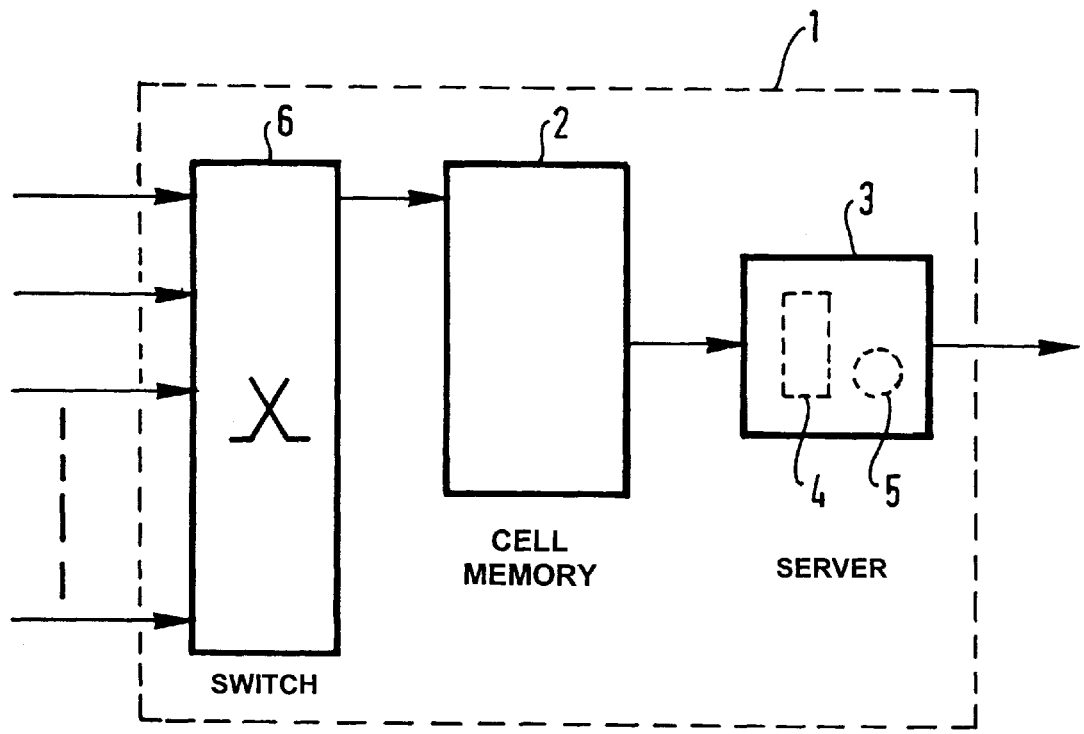
FIG. 1 shows a block diagram of a transmission element according to the invention.

FIG. 1 shows a block diagram of a transmission element in accordance with the invention. The routing logic (or spacial switching of cells) is not detailed insofar as it is part of the state of the art accessible to those skilled in the art. In any case, details on switches can be found in the above-mentioned book by Martin de Prycker, "ATM—Asynchronous Transfer Mode".

Reference number 1 corresponds to the actual switch. Reference number 2 corresponds to a memory in which the cells entering the switch 1 are stored.

The server 3 disposes of means allowing it to access the first cell having a given value for the characteristic chosen. The term class will be used hereinafter to refer to the set of cells contained in the cell memory 2 having the same value for the characteristic chosen.

At each unit of time, the server 3 will choose a class for which it will output a cell. The choice is made from the probability memory 4 which contains a table of correspondence between the classes (i) and the transmission probabilities ($p_i$). This table of correspondence can be established upon the initialization of the network. The probabilities $p_i$ must preferably satisfy the following equation:

$$\sum_{i=1}^{N} p_i = 1$$

where N is the number of classes.

The server then operates as follows: at each instant that the server 3 is ready to transmit a cell, it can be confronted with three cases:

The cell memory 2 is empty. In the case of an ATM network, the server 3 transmits an empty cell. There are only cells for one class. In this case, the server 3 transmits the first cell contained in the memory 2 for this class.

There are cells present in several classes.

In this case, and according to a preferred but non limiting implementation of the server 3, the latter calculates the instantaneous probability $p_i'$ for each class i for which there exists at least one cell in the memory 2 as follows:

$$p_i' = \frac{\alpha_i p_i}{\sum_{j=1}^{N} \alpha_j p_j}$$

where $\alpha_i=1$ if at least one cell of class i is present in the memory and, otherwise, $\alpha_i=0$. A population j of the characteristic has probability $p_j$. The probability of the jth population falling in class i is $p_{i(j)}$. The process actually consists of normalizing the probabilities so as to make the sum of the instantaneous probabilities $p_i'$ equal to 1.

According to a preferred but non limiting embodiment of the server 3, the latter further includes a random number generator 5 and can therefore choose a random number r comprised between 0 and 1. Based upon this number and the instantaneous probabilities (pi'), it can determine i as follows:

$$\sum_{j<i-1} p_j' < r \le \sum_{j<i} p_j'$$

According to a non limiting embodiment of the memory 2, the latter consists of a plurality of FIFO type queues, each corresponding to a class.

Figure 2:
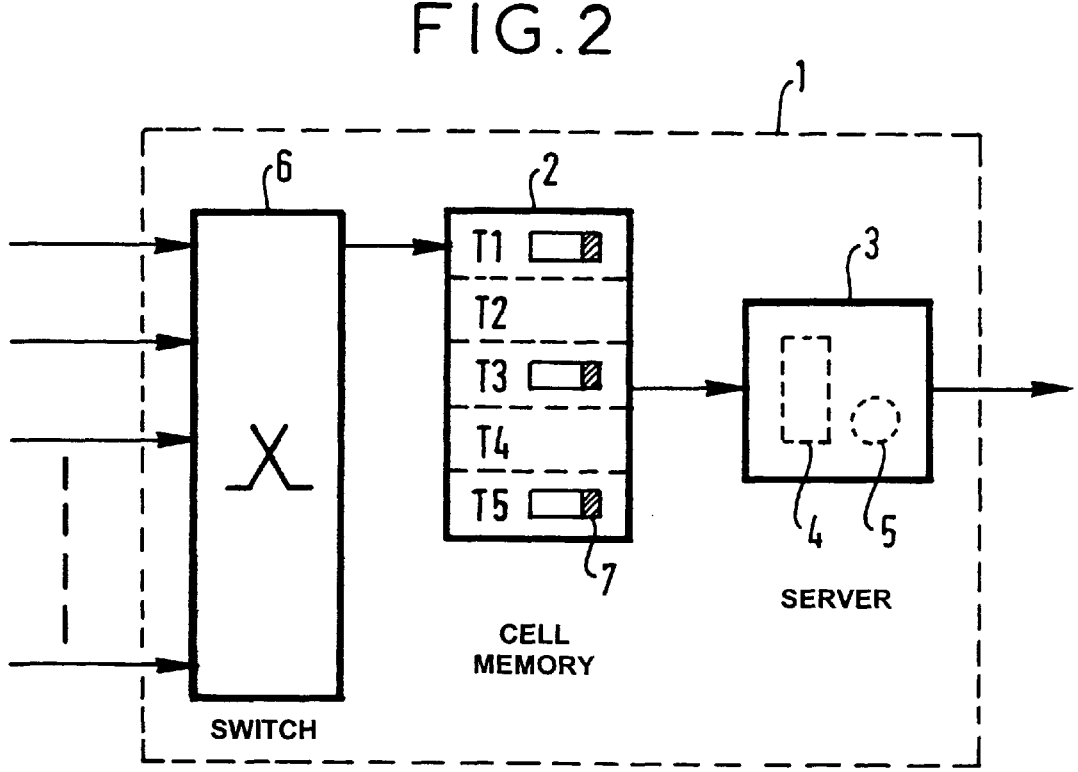
FIG. 2 shows a particular case of a transmission element, provided as an example so as to throw light on the description of the invention.

To get a better understanding of the invention, it can be examined through a concrete example illustrated in FIG. 2.

The characteristic chosen is the type of traffic conveyed by a cell. There is therefore one class for each type of traffic which a cell can convey.

The cell memory 2 contains 5 classes. Three of them (T1, T3 and T5) contain at least one cell, whereas the other two (T2 and T4) are empty. The probability memory 4 contains the following table of correspondence between classes and probabilities:

| Traffic type i | Probability pi |
|---|---|
| 1 | 0.1 |
| 2 | 0.3 |
| 3 | 0.3 |
| 4 | 0.2 |
| 5 | 0.1 |

Considering the presence or absence of cells in the memory corresponding to the traffic type i, $\alpha_1=\alpha_3=\alpha_5=1$ and $\alpha_2=\alpha_4=0$, which yields the following instantaneous probabilities:

$$p_1' = \frac{\alpha_1 p_1}{\sum_{j=1}^{5} \alpha_j p_j} = 0,2$$

$$p_2' = \frac{\alpha_2 p_2}{\sum_{j=1}^{5} \alpha_j p_j} = 0$$

$$p'_3 = \frac{\alpha_3 p_3}{\sum_{j=1}^{5} \alpha_j p_j} = 0,6$$

$$p'_4 = \frac{\alpha_4 p_4}{\sum_{j=1}^{5} \alpha_j p_j} = 0$$

$$p'_5 = \frac{\alpha_5 p_5}{\sum_{j=1}^{5} \alpha_j p_j} = 0,2$$

The server then chooses a random number r comprised between 0 and 1. The traffic type i for which a cell must be transmitted is then simply determined as follows:

$$i = \begin{cases} 1 & \text{if } r \in [0; 0.2[ \\ 3 & \text{if } r \in [0.2; 0.8[ \\ 5 & \text{if } r \in [0.8; 1[ \end{cases}$$

The symbol [ represents that the range does not include the endpoint.

What is claimed is:

1. A switching element (1) comprising a plurality of input ports and at least one output port, a spacial switching mechanism (6), and a cell memory (2) in which cells are stored, said cells being classifiable according to at least one given characteristic which can only take on a finite number of values, characterized in that said switching element (1) includes:

means to access the cells contained in said cell memory (2) selectively according to said characteristic, a probability memory (4) associating a probability $p_i$ with each possible value i of said characteristic, a server (3) which chooses a cell to be transmitted from among the cells contained in said cell memory (2) according to the probabilities ($p_i$) contained in the probability memory (4) and the presence or absence of a cell in the cell memory (2) for each value (i) of said characteristic.

2. A switching element according to claim 1, characterized in that the server 3 calculates, before each transmission of a cell and for each value i of said characteristic, an instantaneous probability $p_i'$ according to the following equation:

$$p'_i = \frac{\alpha_i p_i}{\sum_{j=1}^{N} \alpha_j p_j}$$

where $\alpha_i=1$ if at least one cell of class i is present in the memory and, otherwise, $\alpha_i=0$, and where j is an integer $1 \leq j \leq N$;

and characterized in that the choice of the cell to be transmitted depends on the instantaneous probabilities.

3. A switching element according to claim 2, characterized in that said server 3 includes a random number r generator and in that the choice of the cell to be transmitted depends on the value of said random number r in accordance with the following double inequality:

$$\sum_{j<i-1} p'_j < r \leq \sum_{j<i} p'_j.$$

4. A switching element according to claim 1, characterized in that said memory (2) consists of a plurality of FIFO type queues, each corresponding to a possible value of said characteristic.

5. A switching element according claim 1, characterized in that said characteristic is the type of traffic conveyed by said cell.

6. A switching element according claim 1, characterized in that said characteristic is the connection to which said cell belongs.

* * * * *